July 22, 1941.   S. BAXENDALE   2,250,088
STOCK FEEDING MEANS FOR HOLLOW ROTARY SPINDLES
Filed May 8, 1939
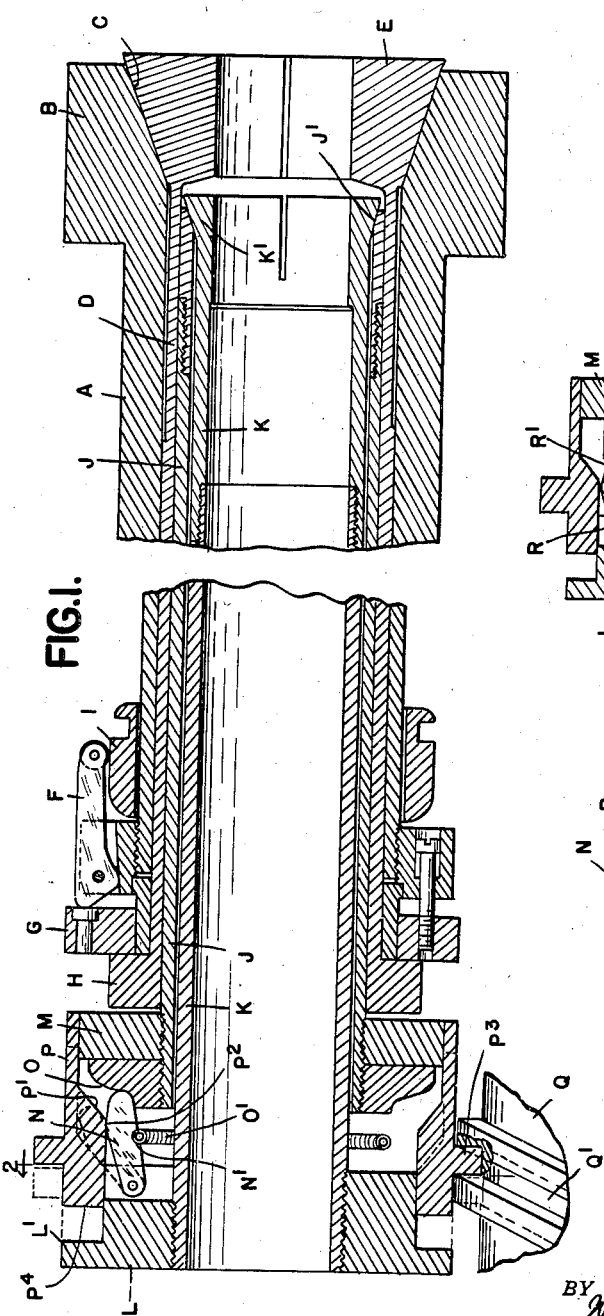
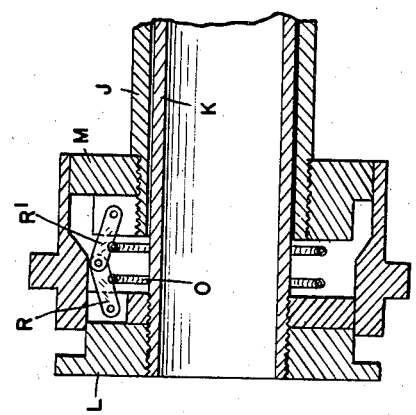
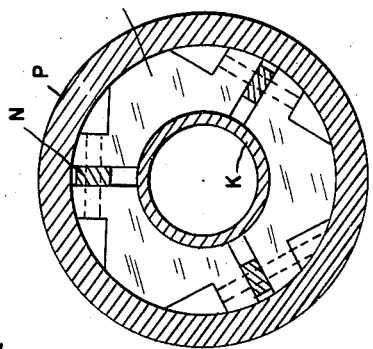
INVENTOR.
SAMUEL BAXENDALE
BY *Whittemore Hulbert & Belknap*
ATTORNEYS Patented July 22, 1941

2,250,088

UNITED STATES PATENT OFFICE 2,250,088

STOCK FEEDING MEANS FOR HOLLOW ROTARY SPINDLES

Samuel Baxendale, Dearborn, Mich., assignor to Modern Collet & Machine Company, Ecorse, Mich., a corporation of Michigan Application May 8, 1939, Serial No. 272,487

4 Claims. (Cl. 29—62)

This invention relates to stock feeding means designed for use in connection with either single or multiple hollow spindle lathes, and it is the primary object of the invention to avoid certain defects in constructions, for this purpose, as heretofore made. One form of feeder which is extensively used includes a collet longitudinally slotted to form a plurality of resilient radially inwardly extending gripping jaws for engaging the stock bar. This collet at all times frictionally engages the stock bar, and during its forward movement carries the bar with it, while during the return the work holding collet or chuck of the hollow spindle holds the bar from movement and the feeding collet is moved rearward thereover. The frictional engagement between the jaws and the stock bar rapidly wears the former during this rear movement so that in time they become ineffective and must be bent further inward or otherwise changed to restore feeding action.

It is the object of the instant invention to relieve the feeder from this frictional engagement during the return movement thereof. It is a further object to form a more positive gripping engagement between the collet and the stock bar during its forward movement and further to obtain various other advantages. With these objects in view, the invention consists in the construction as hereinafter set forth.

In the drawing:

Figure 1 is a longitudinal central section through a rotary hollow spindle provided with my improved stock feeder;

Figure 2 is a cross section on line 2—2 of Figure 1;

Figure 3 is a view similar to a portion of Figure 1, showing a modified construction.

While as above stated, my invention is applicable to either single or multiple hollow spindle lathes, I have specifically illustrated it in connection with a single spindle. As shown, A is the rotary hollow spindle which is of the usual construction, being provided at its forward end with a head B having the internal rearwardly tapering conical bearing C. D is a tubular member longitudinally slidable within the hollow spindle having at its forward end the split jaws E, the outer surfaces of which engage the conical bearing C, so that a rearward movement of said tube with respect to the spindle will contract the jaws into engagement with the work. The tubular member D is actuated by suitable mechanism which as diagrammatically illustrated includes a plurality of finger levers F pivotally mounted on a rearward extension of the hollow spindle, a slidable disk-shaped head G in contact with the collar H on the tubular member D, and a cam sleeve I for actuating said finger levers to move said head G and collar H, and thereby contract the jaws E of the collet. The construction just described forms no part of the instant invention and any other suitable mechanism for operating the work holding collet may be used in place thereof.

My improved stock feeding mechanism comprises a pair of concentric tubular members J and K longitudinally slidable within the hollow spindle or within the tubular member D in case the latter is used. One of these tubular members, preferably the outer one, has an internal tapering bearing J' at its forward end, and the other member is split at its forward end to form a plurality of resilient jaws K' movable radially by a relative axial movement of the members J and K. The tubular members J and K project rearward beyond the rear end of the spindle and tube D when the jaws J' are at the forward end of their movement or adjacent to the work holding jaws E. The member K projects rearward beyond the member J and is provided at its rear end with a head L having a threaded engagement or otherwise secured to the tube. The member J is also provided at its rear end with a radially extending head M rigidly secured to the tube preferably by a threaded engagement therewith. The heads L and M are normally spaced from each other and have arranged between the same, means for further separating them to relatively move the tubes J and K. As shown in Figure 1, this means comprises a plurality of levers N pivotally attached to the head L and extending forward therefrom into engagement with a cam O seated on the head M. This cam is so fashioned that when the levers N are in inclined position as indicated in dotted lines, the tubes J and K will be relatively positioned to release the resilient jaws K' from clamping the stock. On the other hand, when the levers N are moved radially inward on the cam into the position shown in full lines they will separate the heads L and M. This will cause the relative movement of the tubes J and K so as to force the jaws K' radially inward to clamp the stock. The levers N are yieldably moved outward by suitable resilient means, such as an annular coil spring O', surrounding the tube K and engaging notches N' in said levers. The inward movement of the levers N is effected by a sleeve P which slidably engages the heads L and M, and has on its inner face a cam portion P'. When the sleeve is moved forward upon said heads, the cam P' engaging the levers, will force them radially inward over the cam O which will effect the separation of the heads and the clamping of the jaws. Also, a portion P² of the sleeve beyond the cam P' engaging the levers will hold them locked in this inward position. On the other hand, when the sleeve P is moved rearward, the levers N will be released so that the spring O' will move them outward. This permits relative movement of the heads L and M toward each other with a corresponding movement of the tubes J and K, thereby releasing the clamping of the jaws.

The sleeve P also has a shouldered engagement with the heads L and M, so that after taking up the lost motion it will effect the simultaneous forward or rearward movement of the tubes J and K. Thus, the rear end of the sleeve engages a shoulder L' on the head L to feed the tubes rearward and the cam P' engages the cam O to feed the tubes forward.

The stock feeding means is actuated by any suitable reciprocatory member which, however, directly engages the member P, and only indirectly actuates the tubular members J and K. As diagrammatically illustrated the actuating member is a rotary cam Q which has a spiral groove Q' therein for engaging an external collar P³ on the member P. Thus, during the rotation of the cam Q it will in one portion of this movement move the member P in a forward direction, while in another portion of its movement the member P will be moved rearwardly.

With the construction as described, the operation is as follows. Assuming that the tubular members J and K are at the rear end of their reciprocation and that a stock bar is inserted therein, then when the cam Q moves the member P forward, it will first actuate the levers N which through the mechanism described, will contract the jaws K' into gripping engagement with the stock bar. As soon as the lost motion of the member P is taken up, it will through the head M, actuate the tubular members J and K carrying the stock bar forward to the position indicated in full lines, Figure 1. While in this position the jaws E of the work holding collet will be moved into gripping position through the medium of the mechanism including the members F, G, H and I, and other suitable means (not shown). When the cam Q moves the member P rearward the first effect is to disengage the portion P² from the levers N, whereupon the spring O will move these levers radially outward, thereby releasing the gripping tension of the jaws K'. After these jaws are fully released the engagement of the shoulder P⁴ with the head L will carry the tubular members J and K rearward, thereby returning the feeder to its initial position, but without any objectionable frictional engagement with the stock bar. Thus, during each reciprocation of the member P by the cam Q the jaws K' will engage the stock bar in advance of their forward movement, and will release the stock bar in advance of their rearward movement.

In the operation just described, it will be understood that the engagement between the jaws K' of the tube K and the tapering bearing J' of the tube J is at such an angle as to be outside the angle of friction. Thus, the resiliency of the jaws will effect the return movement of the tubes J and K. In the modification shown in Figure 3, I have shown a positive mechanism for effecting this return movement which is not dependent on the angle of friction. This comprises a pair of toggle levers R and R' which are pivotally connected to each other and respectively to the heads L and M. These levers R are moved outward by the annular coil spring O, and in so doing will exert a positive pull on the cooperating member. This will draw the tube J rearward with respect to the tube K, thereby releasing the jaws K'.

What I claim as my invention is:

1. The combination with a rotary hollow spindle, of means for feeding stock therethrough comprising a pair of concentric tubes longitudinally slidable within said spindle, a collet at the forward end of said tubes positively actuated to contract and to release the same by a relative movement of said tubes, means at the rear ends of said tubes for positively reciprocating one, and means operating upon the reversal of said reciprocating means for positively relatively moving said tubes to contract said collet prior to its movement in the forward direction and to release said collet prior to its return movement.

2. The combination with a rotary hollow spindle, of means for feeding stock therethrough comprising a pair of concentric tubes longitudinally slidable within said spindle, the inner tube having at its forward end a plurality of radially movable jaws and the outer tube having an internal tapering bearing for engaging said jaws to radially contract the same, means for reciprocating said tubes having a positive connection with the rear end of the outer tube and a lost motion connection with the rear end of the inner tube, and cam means automatically operating during the taking up of the lost motion in each direction of reciprocation for positively relatively moving said tubes to contract said jaws prior to the feeding movement in the forward direction and to release said jaws prior to the return movement.

3. The combination with a rotary hollow spindle, of means for feeding stock therethrough comprising a pair of concentric tubes longitudinally slidable within said spindle, a collet at the forward end of said tubes positively actuated to engage and release the stock by a relative movement of said tubes, a pair of spaced heads connected respectively to the rear ends of said tubes, a plurality of members pivotally attached to one of said heads and engaging the other of said heads at points radially outward from their pivotal attachments, a sleeve surrounding said members having a lost motion engagement with said heads and provided with a cam surface for moving said members radially inward, and means engaging said sleeve for reciprocating said tubes, whereby the initial forward movement of said sleeve will contract said members and thereby relatively move said tubes to engage said collet prior to the simultaneous forward movement of said tubes and the initial rearward movement of said sleeve will release said collet prior to the simultaneous rearward movement of said tubes.

4. The combination with a rotary hollow spindle, of means for feeding stock therethrough comprising a pair of concentric tubes longitudinally slidable within said spindle, a collet at the forward end of said tubes positively operated to engage and to release the stock by a relative movement of said tubes, a pair of spaced heads respectively connected to the rear ends of said tubes, a plurality of levers pivotally attached to one of said heads and inclining outward into engagement with the other of said heads, resilient means for yieldably holding said levers in such position, a sleeve surrounding said levers and having a lost motion movement between said heads, said sleeve being provided with a conical portion for engaging said levers to force the same radially inward during the forward lost motion between said heads and for releasing said levers during the rearward lost motion between said heads, and reciprocating means engaging said sleeve whereby said collet will be contracted prior to the simultaneous forward movement of said tubes and will be released prior to the simultaneous rearward movement of said tubes.

SAMUEL BAXENDALE.